United States Patent
Nashizawa

(10) Patent No.: US 8,730,341 B2
(45) Date of Patent: *May 20, 2014

(54) IMAGE PROCESSING APPARATUS, IMAGE PICKUP APPARATUS, CONTROL METHOD FOR IMAGE PROCESSING APPARATUS, AND STORAGE MEDIUM STORING CONTROL PROGRAM THEREFOR

(75) Inventor: Hiroaki Nashizawa, Tokyo (JP)

(73) Assignee: Canon Kabushiki Kaisha (JP)

( * ) Notice: Subject to any disclaimer, the term of this patent is extended or adjusted under 35 U.S.C. 154(b) by 156 days.

This patent is subject to a terminal disclaimer.

(21) Appl. No.: 13/324,091

(22) Filed: Dec. 13, 2011

(65) Prior Publication Data

US 2012/0081584 A1    Apr. 5, 2012

Related U.S. Application Data

(63) Continuation of application No. 12/430,291, filed on Apr. 27, 2009, now Pat. No. 8,098,294.

(30) Foreign Application Priority Data

Apr. 30, 2008 (JP) ................. 2008-118500

(51) Int. Cl.
*H04N 5/228* (2006.01)
*H04N 9/68* (2006.01)
*H04N 5/217* (2011.01)
*G06K 9/00* (2006.01)
*H04N 5/357* (2011.01)
*H04N 9/04* (2006.01)

(52) U.S. Cl.
CPC ............. *H04N 5/3572* (2013.01); *H04N 9/045* (2013.01)
USPC ......... 348/222.1; 348/234; 348/241; 382/167

(58) Field of Classification Search
CPC ............................ H04N 5/3572; H04N 9/045
USPC ............... 345/593, 613; 348/222.1, 234, 241, 348/272; 382/167, 308
See application file for complete search history.

(56) References Cited

U.S. PATENT DOCUMENTS

| 6,724,702 B2 | 4/2004 | Taguchi et al. |
| 7,057,659 B1 | 6/2006 | Mihara et al. |
| 7,706,609 B2 | 4/2010 | Bennett et al. |
| 8,098,294 B2 * | 1/2012 | Nashizawa ................. 348/222.1 |
| 2007/0103744 A1 | 5/2007 | Chiba |

FOREIGN PATENT DOCUMENTS

| JP | 2001-145117 A | 5/2001 |
| JP | 2007-133592 A | 5/2007 |

OTHER PUBLICATIONS

Ed Chang et al., "Color Filter Array Recovery Using a Threshold-based Variable Number of Gradients"; Part of the IS&T/SPIE Conference on Sensors, Cameras, and Applications 36 for Digital Photography; San Jose, California ; Jan. 1999; SPIE vol. 3650 pp. 36-43.

* cited by examiner

*Primary Examiner* — David N Spector
(74) *Attorney, Agent, or Firm* — Rossi, Kimms & McDowell LLP

(57) ABSTRACT

An image processing apparatus capable of suppressing color fringing in a color image further effectively by image processing. A determination unit determines a region in which signal levels for a color plane in a color image produced by photoelectric conversion of an optical image of a subject exhibit a monotonic increase or a monotonic decrease, as a color fringing region in which color fringing occurs. An estimation unit estimates an intensity of the color fringing in the color fringing region determined by the determination unit. A removal unit deducts an estimate value of the intensity of the color fringing estimated by the estimation unit from the intensity of the color fringing in the color fringing region.

5 Claims, 18 Drawing Sheets

*FIG.10*

| a | b | c |
|---|---|---|
| d | p | e |
| f | g | h |

*FIG.11*

| a' | b' | c' |
|---|---|---|
| d' | p' | e' |
| f' | g' | h' |

FIG.16

| 0 | 0 | 1 |
|---|---|---|
| 0 | 1 | 1 |
| 0 | 1 | 1 |

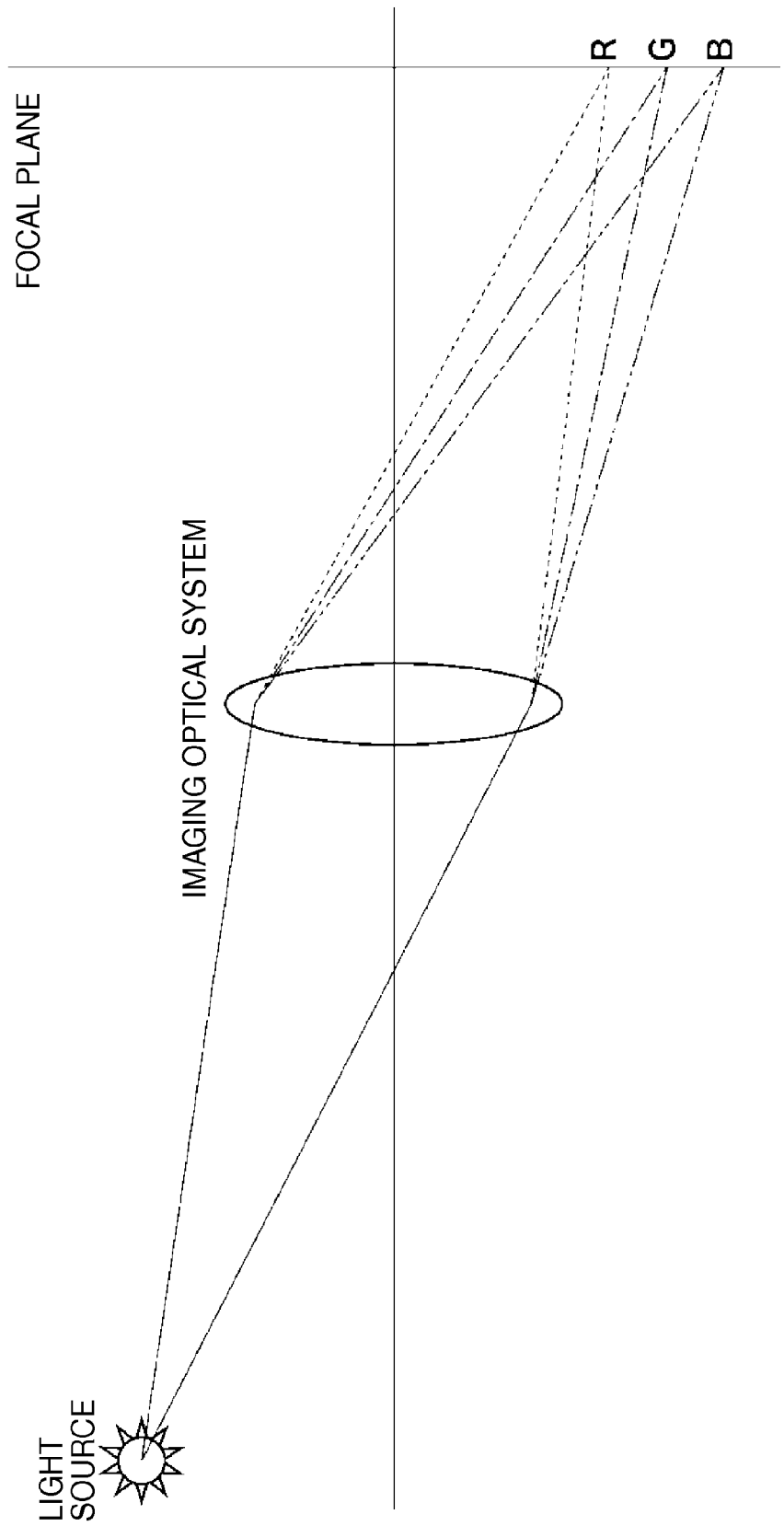

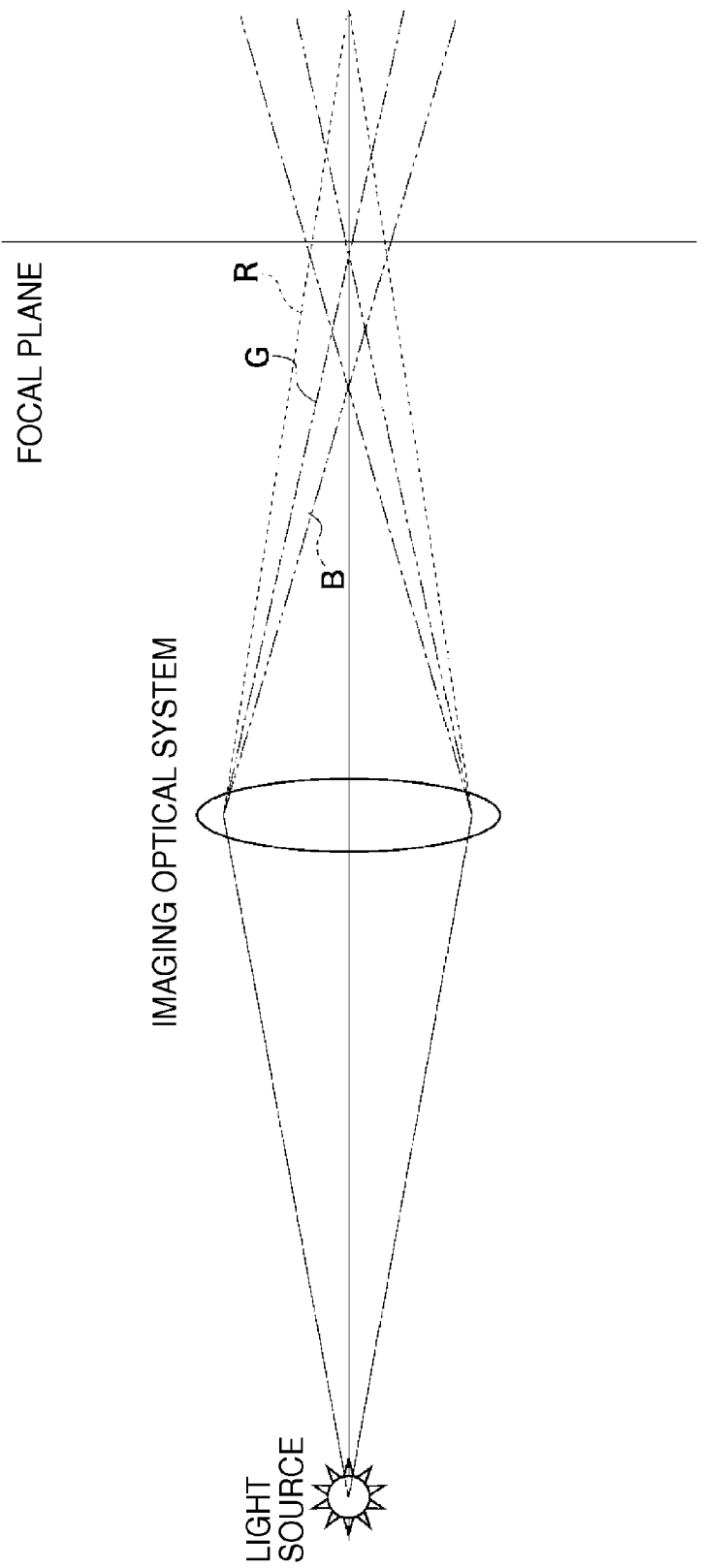

IMAGE PROCESSING APPARATUS, IMAGE PICKUP APPARATUS, CONTROL METHOD FOR IMAGE PROCESSING APPARATUS, AND STORAGE MEDIUM STORING CONTROL PROGRAM THEREFOR

CROSS REFERENCE TO RELATED APPLICATION

This application is a continuation of and claims priority from U.S. patent application Ser. No. 12/430,291, filed Apr. 27, 2009, the entire content of which is hereby incorporated herein by reference. This application and the '291 application also claim priority from JP Application No. 2008-118500, filed Apr. 30, 2008.

BACKGROUND OF THE INVENTION

1. Field of the Invention

The present invention relates to an image processing apparatus, an image pickup apparatus, a control method for the image processing apparatus, and a storage medium storing a control program therefor, which have functions for suppressing color fringing in a taken color image.

2. Description of the Related Art

Conventionally, in an image pickup apparatus capable of taking color images, chromatic aberration in an imaging optical system that makes an optical image of a subject be formed on an image pickup device may cause a color that does not originally exist to appear around a bright part of the image as color fringing. In visible light color imaging using an image pickup apparatus, color fringing easily occurs in a part away from green, which is the central wavelength for the imaging optical system, and an artifact in blue or red, or purple, which is a mixture thereof, appears as a fringe, which is called "color fringe" or "purple fringe" or the like.

Chromatic aberration in an imaging optical system in an image pickup apparatus can be optically suppressed by a combination of plural lenses having different dispersions. However, in recent years, as image pickup apparatuses (digital cameras) have been downsized, there is an increasing need for high resolution for an image sensor used for an image pickup device as well as downsizing of optical systems, which has caused difficulty in sufficiently suppressing chromatic aberration by the optical system alone. Therefore, there is a need for suppressing the aforementioned artifact by image processing.

Chromatic aberration is roughly divided into transverse chromatic aberration (magnification chromatic aberration) and longitudinal chromatic aberration (axial chromatic aberration). Transverse chromatic aberration is, as shown in FIG. 17, a phenomenon in which the image location shifts in a direction along the image plane according to the wavelength. Also, longitudinal chromatic aberration is, as shown in FIG. 18, a phenomenon in which the image location shifts in a direction along the optical axis according to the wavelength. When a primary color-type digital imaging system is used, color fringing caused by transverse chromatic aberration can be corrected by geometric conversion in which different distortions are provided to respective color planes for R (red), G (green) and B (blue) (see, for example, USP6724702B1).

Meanwhile, where an image is focused with reference to the plane for G (green), which exhibits the central wavelength of the visible light range, longitudinal chromatic aberration causes the image to be unclear (blurred) because the focal points on the planes for R (red) and B (blue), which reside in edges of the visible light range, cannot be brought to the subject. Color fringing caused by longitudinal chromatic aberration cannot be corrected by such geometric conversion as mentioned above.

A method for correcting color fringing using the characteristic of color fringing mainly occurring around a whiteout region (a region reaching a preset signal saturation level) has been proposed (see, for example, Japanese Laid-Open Patent Publication (Kokai) No. 2007-133592). In the method, a saturated region of the G (green) plane is searched for, signals of pixels surrounding the saturated region are integrated to calculate the amount of correction, and color fringing is corrected. Also, methods in which the color saturation of a region expected to cause color fringing is lowered to diminish the appearance of color fringing have been proposed (see, for example, Japanese Laid-Open Patent Publication (Kokai) No. 2001-145117).

Although in an image taken by an image pickup apparatus, color fringing occurs mainly around a whiteout region, color fringing that gives a feeling of discomfort to viewers occurs also in a region with no whiteout. For example, in an image taken of a scene of sunbeams streaming through the trees, distinct color fringing occurs at the boundary between the blue sky background with no whiteout and the tree branches.

However, a sufficient effect cannot be obtained by the processing of searching for a whiteout region and correcting color fringing in its surrounding region, like that disclosed in Japanese Laid-Open Patent Publication (Kokai) No. 2007-133592, alone. Meanwhile, the processing of lowering the color saturation of a region expected to cause color fringing, like that described in Japanese Laid-Open Patent Publication (Kokai) No. 2001-145117, provides an effect of eliminating the color in color fringing to reduce unnaturalness, but may lower the color saturation of a region with no color fringing because the processing also affects the original colors of the subject and a processing-target region is determined regardless of whether or not the region actually has color fringing.

SUMMARY OF THE INVENTION

The present invention provides an image processing apparatus, an image pickup apparatus, a control method for the image processing apparatus, and a storage medium storing a control program therefor capable of suppressing color fringing in a color image further effectively by image processing.

Accordingly, the present invention provides an image processing apparatus comprising a determination unit adapted to determine a region in which signal levels for a color plane in a color image produced by photoelectric conversion of an optical image of a subject exhibit a monotonic increase or a monotonic decrease, as a color fringing region in which color fringing occurs, an estimation unit adapted to estimate an intensity of the color fringing in the color fringing region determined by the determination unit, and a removal unit adapted to deduct an estimate value of the intensity of the color fringing estimated by the estimation unit from the intensity of the color fringing in the color fringing region.

Accordingly, the present invention provides an image pickup apparatus comprising the image processing apparatus described above.

Accordingly, the present invention provides A control method for an image processing apparatus comprising a determination step of determining a region in which signal levels for a color plane in a color image produced by photoelectric conversion of an optical image of a subject exhibit a monotonic increase or a monotonic decrease, as a color fringing region in which color fringing occurs, an estimation step of estimating an intensity of the color fringing in the color fringing region determined in the determination step, and a removal step of deducting an estimate value of the intensity of the color fringing estimated in the estimation step from the intensity of the color fringing in the color fringing region.

Accordingly, the present invention provides a computer-readable storage medium storing a control program causing a computer to execute the above described control method for the image processing apparatus.

According to the present invention, the intensity of color fringing in a color fringing region in which the signal levels exhibit a monotonic increase or a monotonic decrease is estimated, and the estimate value of the intensity of the color fringing is deducted from the intensity of the color fringing in the color fringing region. Consequently, color fringing in a color image can be further effectively suppressed by image processing.

The features and advantages of the invention will become more apparent from the following detailed description taken in conjunction with the accompanying drawings.

BRIEF DESCRIPTION OF THE DRAWINGS

FIG. 10 shows a region of 3×3 pixels in an image.

FIG. 11 shows the result of applying low-pass filtering process to the respective pixels in a region of 3×3 pixels in an image.

FIG. 16 shows a region of 3×3 pixels in a B plane according to the result of monotonic increase/decrease determination.

FIG. 17 shows a principle of occurrence of transverse chromatic aberration.

FIG. 18 shows a principle of occurrence of longitudinal chromatic aberration.

DESCRIPTION OF THE PREFERRED EMBODIMENTS

Figure 1:
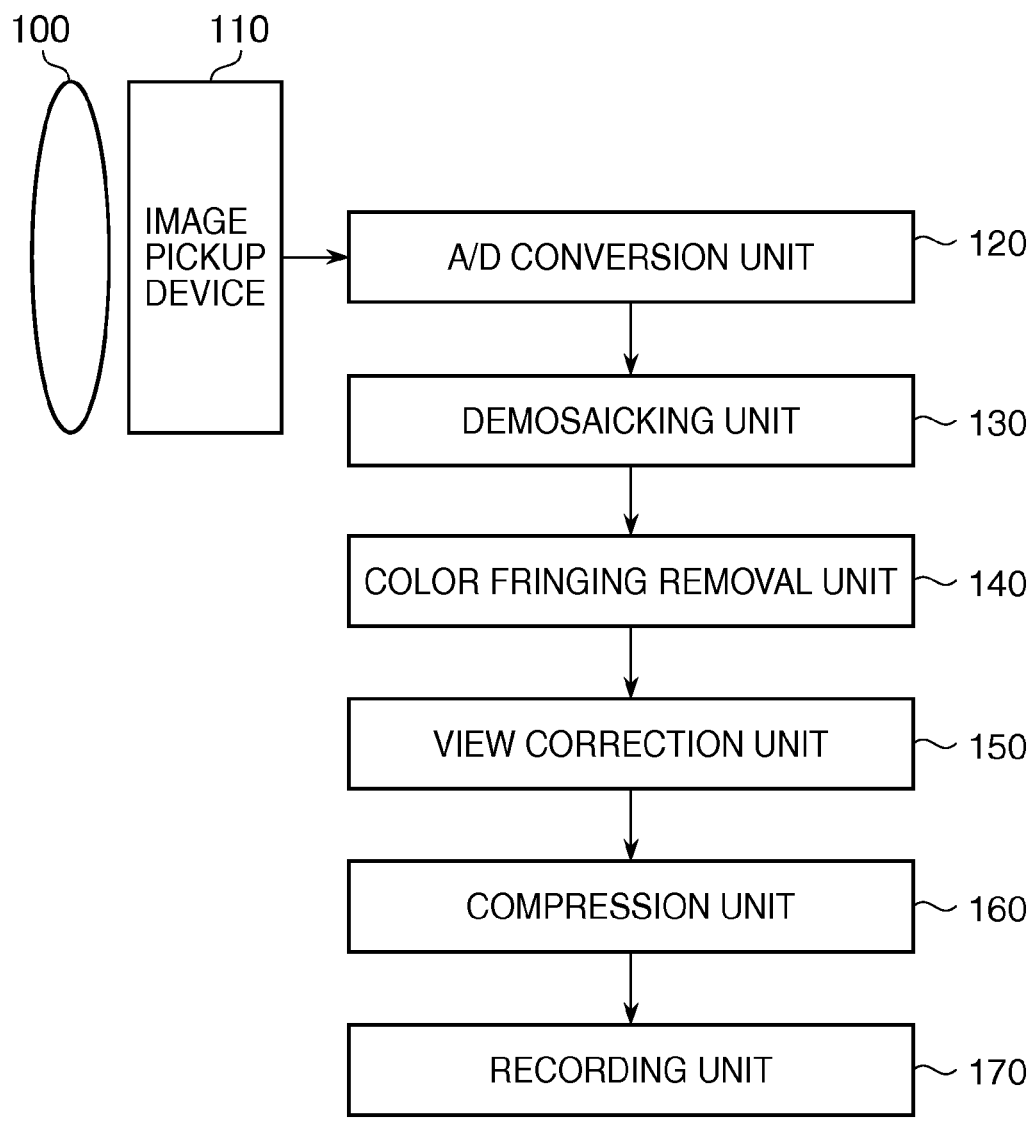
FIG. 1 is a block diagram showing a configuration of a main part of an image pickup apparatus, which is an image processing apparatus according to an embodiment of the present invention.

Hereinafter, an embodiment of the present invention will be described with reference to the drawings. First, an overview of the embodiment of the present invention is provided.

The present embodiment provides an image processing technique that effectively removes color fringing occurring in a color image taken by an image pickup apparatus and enables reproduction of original colors. In the present embodiment, an image pickup apparatus includes: a determination unit adapted to determine a color fringing region in a color image; an estimation unit adapted to estimate the intensity of color fringing in the color fringing region; and a removal unit adapted to deduct the estimate value from the intensity of the color fringing in the color fringing region. The image pickup apparatus further includes an excessive removal suppression unit and a space calculation unit.

The determination unit determines a region in which the levels of signals in any color plane from among a plurality of color planes included in a color image exhibit a monotonic increase or a monotonic decrease, as a color fringing region in which color fringing occurs. Also, the determination unit applies low-pass filtering process to a removal amount plane representing an amount of removal for a color fringing removal target color plane. Also, the determination unit applies low-pass filtering process to a color plane before making a determination, and then makes a determination.

Although several methods can be considered for determining a color fringing region by the determination unit, here, determination is made based on the characteristics of change in the intensity of color fringing in a certain pixel section. Color fringing caused by axial chromatic aberration occurs as a result of the image location shifting in a direction along the optical axis according to the wavelength, and thus, in the case of, for example, blue fringing, the blue plane (hereinafter, the B plane) will be out of focus (i.e., blurred).

Color fringing due to blurring exists over a certain pixel section, and the intensity of the color fringing in this case has the characteristic of gradually decreasing from a highlighted portion to a shadowed portion of the image. Accordingly, a region where change in the intensity of color fringing in a certain pixel section has the characteristic of monotonically increasing or decreasing is determined as a color fringing region. Regions for which the determination of whether or not to exhibit a monotonic increase or a monotonic decrease is made by the determination unit include either a horizontal, vertical or oblique pixel section with an attention pixel as its center, or a horizontal, vertical or oblique pixel section with an attention pixel at an end thereof, in a color image.

The estimation unit estimates the intensity of color fringing in the color fringing region according to the difference between the signal intensities for the plurality of the color planes included in the color image. The removal unit deducts the estimation value of the color fringing intensity, which has been estimated by the estimation unit, from the intensity of the color fringing in the color fringing region. In other words, the removal unit determines a plane for a color in a wavelength range in which chromatic aberration remains in the imaging optical system used for taking the image as a color fringing removal target, and reduces the intensity of the color fringing portion of the color plane.

The excessive removal suppression unit can also suppress hue change in the color image, which has been caused by the removal unit. In the present embodiment, the fringing removal target color plane is the B plane or the red plane (hereinafter, "R plane"). In other words, the fringing removal target color plane color is at least one of the B plane and the R plane. A color-difference plane U/V indicating the color in the wavelength range in which chromatic aberration remains in the imaging optical system used for taking the color image may be determined as a color fringing removal target.

Since color fringing is a spatial action, a space calculation is performed by the space calculation unit in order to estimate the image intensity of color fringing from the color image. The space calculation unit calculates the gradient of the signal intensity in a color plane. The estimation unit estimates the intensity of the color fringing in the color fringing region, using either the gradient of the signal intensity in the color fringing removal target color plane, which has been calculated by the space calculation unit, or the gradient of the signal intensity in a color plane (reference plane), other than the color fringing removal target color plane, set as a reference.

In other words, in space calculation, a color plane for which a high resolution has been provided is referred to as a reference plane, other than the removal target color plane. A reference plane is a plane for a color in a wavelength range in which chromatic aberration has favorably been corrected in the imaging optical system used for taking the image or a color plane representing brightness, and is generally a green plane (hereinafter, "G plane") or a brightness plane (hereinafter, "Y plane"). Although several types of space calculation can be considered, calculation of an image intensity gradient is used here.

An image intensity gradient refers to a signal intensity gradient for a reference plane or a removal target color plane. Where an image intensity gradient is calculated, the estimation unit outputs a value depending on the image intensity gradient. In this case, the output may simply be a value proportional to the image intensity gradient. As described above, the estimate value of the amount of color fringing to be removed can be obtained. However, this estimate value is not necessarily correct, i.e., there may be a shortage or overage. In the case of a shortage in the estimate value, the color fringing is not removed, and some amount of color fringing remains.

Meanwhile, in the case of an overage in the estimate value, an excessive removal is performed on the color plane, resulting in an inversion of the hue of the color fringing. According to the present inventors' experiment, excessive removal for a color plane produces a significantly unnatural image compared to insufficient removal for a color plane. Therefore, in order to suppress the hue inversion, the image pickup apparatus includes the excessive removal suppression unit as described above.

By the excessive removal suppression unit, only pixels in a certain color range are determined to be a target for removal by the removal unit, and the color range after the removal is limited to a certain range. These two certain ranges are the same. In particular, the removal target color plane may be a color plane whose intensity is larger than the intensity of the color plane referred to. The image processing method as described above can provide an image with reduced color fringing.

Next, the details of the embodiment of the present invention will be described with reference to FIGS. 1 to 17.

FIG. 1 is a block diagram showing a main part of an image pickup apparatus as an image processing apparatus according to the embodiment of the present invention.

In FIG. 1, the image pickup apparatus includes an imaging optical system 100, an image pickup device 110, an A/D conversion unit 120, a demosaicking unit 130, a color fringing removal unit 140, a view correction unit 150, a compression unit 160 and a recording unit 170. The color fringing removal unit 140 is an example for providing the determination unit, the estimation unit, the removal unit and the space calculation unit according to the present invention.

An image of a subject field is formed on the image pickup device 110 via the imaging optical system 100. The image pickup device 110 is configured as a single-plate color image pickup device including common primary color filters, and produces a color image consisting of plural color signals by photoelectric conversion of an optical image of a subject. The primary color filters in the image pickup device 110 are three types of color filters having a main transparent wavelength range around 650 nm, 550 nm and 450 nm, respectively, and produce color planes corresponding to the R (red), G (green) and B (blue) bands, respectively.

Although in the present embodiment, the image pickup device 110 includes the primary color filters for R, G and B, it is not limited to them. The image pickup device 110 may include complementary color filters. Where complementary color filters are employed, a color image including color planes for R, G and B can also be provided by color conversion process.

Figure 2:
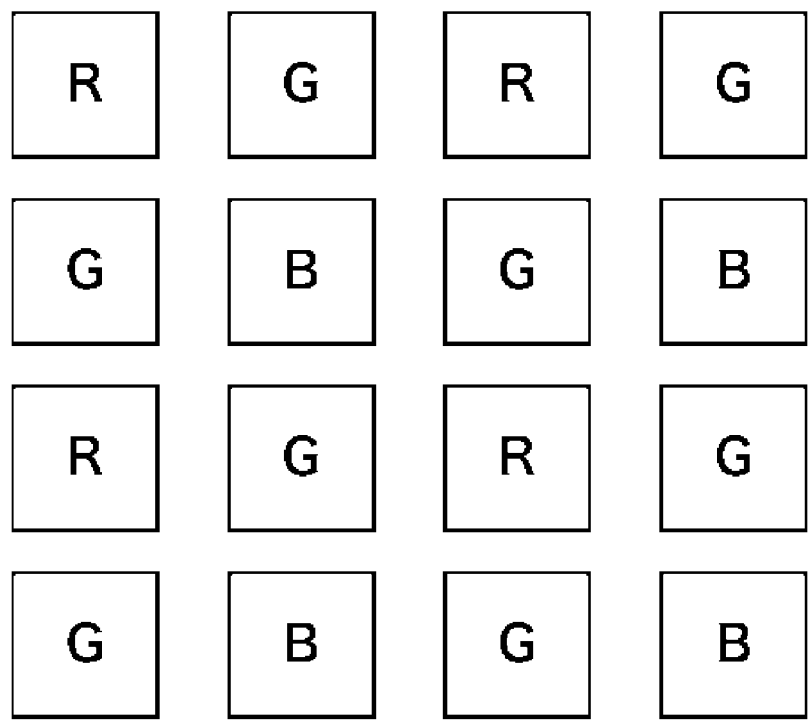
FIG. 2 shows an arrangement of color elements in a primary-color filter included in an image pickup device in the image pickup apparatus shown in FIG. 1.

The image pickup device 110 configured as a single-plate color image pickup device has a structure in which three types of color filters (R, G and B) are spatially arranged for respective pixels as shown in FIG. 2, and each pixel can obtain the intensity of only a single color plane. Thus, a color mosaic image is output from the image pickup device 110. The A/D conversion unit 120 converts the color mosaic image output from the image pickup device 110 as an analog voltage into digital data suitable for the subsequent image processing.

The demosaicking unit 130 interpolates the color mosaic image, which has been converted into digital data, by an interpolation technique to produce a color image with R, G and B color information for all the pixels. Although many methods, such as simple linear interpolation and a complex technique described in "Color filter array recovery using a threshold-based variable number of gradients" (E. Chang, S. Cheung and D. Pan, Proc. SPIE, vol. 3650, pp. 36-43, January 1999), have been proposed for the interpolation technique, the interpolation in the present invention is not limited to a particular interpolation technique.

Figure 3:
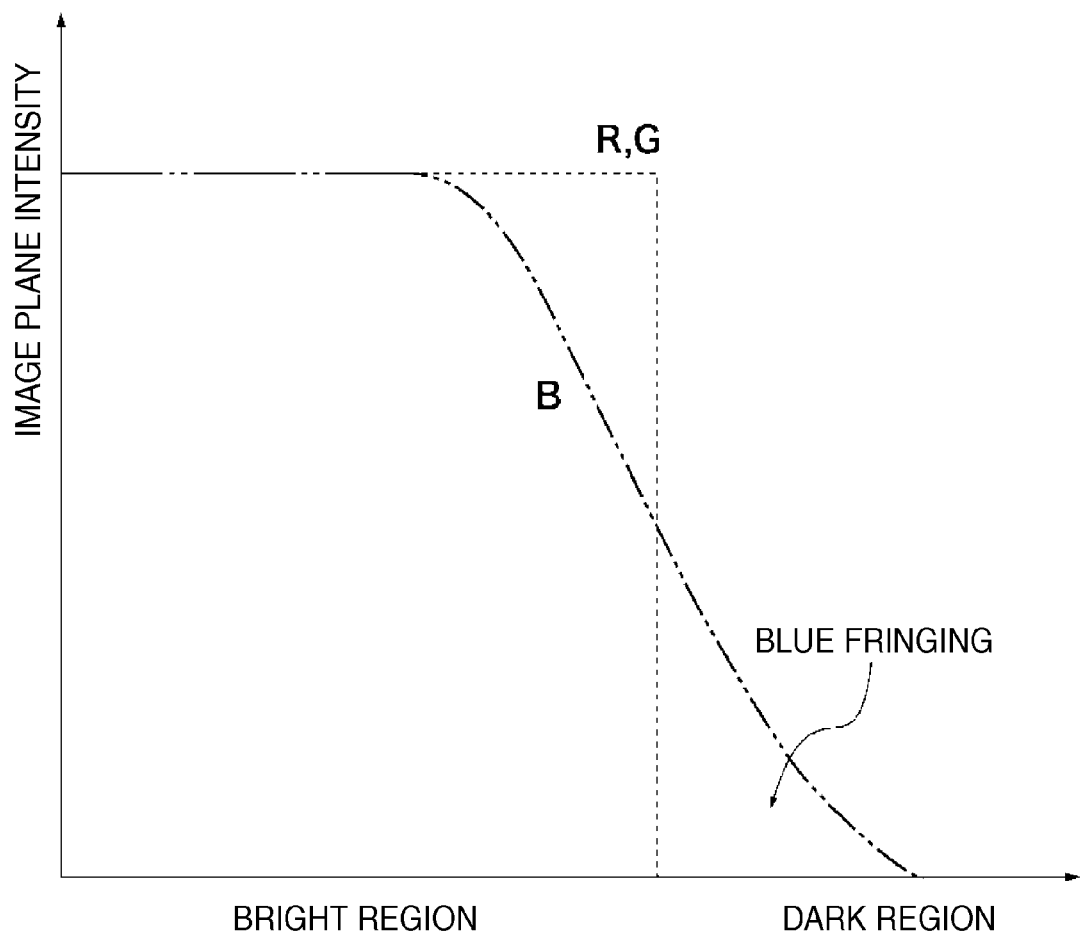
FIG. 3 shows blue fringing occurs at the boundary between bright and dark regions in a color image taken and produced by the image pickup apparatus shown in FIG. 1.

The resolution of the B plane of the color image produced by the demosaicking unit 130 is lower than the resolution of the G plane because of chromatic aberration in the imaging optical system 100. Thus, in the boundary between a bright region and a dark region in the color image, as shown in FIG. 3, blue blurs, causing an artifact like blue edging (blue color fringing) around the bright region. The abscissa axis in FIG. 3 indicates brightness and darkness, and the ordinate axis indicates image plane intensity (signal intensity). Red blurs where the resolution of the R plane is lower than the resolution of the G plane.

The color fringing removal unit 140 removes the artifact from the color image by image processing. The image processing method according to the present embodiment, which relates to artifact removal process, will be described in details later. The view correction unit 150, which mainly performs image appearance improvement process on the color image, performs image correction such as, for example, tone curve (gamma) correction, color saturation enhancement, hue correction or edge enhancement. The compression unit 160 compresses the color image that has been subjected to the image correction by a method such as JPEG to reduce the size of the color image for recording it. The recording unit 170 records the processed digital image signals in a storage medium (e.g., flash memory (R)).

The image pickup device 110, the A/D conversion unit 120, the demosaicking unit 130, the color fringing removal unit 140, the view correction unit 150 and the compression unit 160 in the image pickup apparatus may be formed of individual (separate) devices or may also be formed of a single device. In other words, in reality, a single microprocessor may perform process to be performed by plural components of the image pickup apparatus.

Next, an operation for removing color fringing by image processing in the image pickup apparatus having the above-described configuration will be described with reference to the flowchart in FIG. 4.

Figure 4:
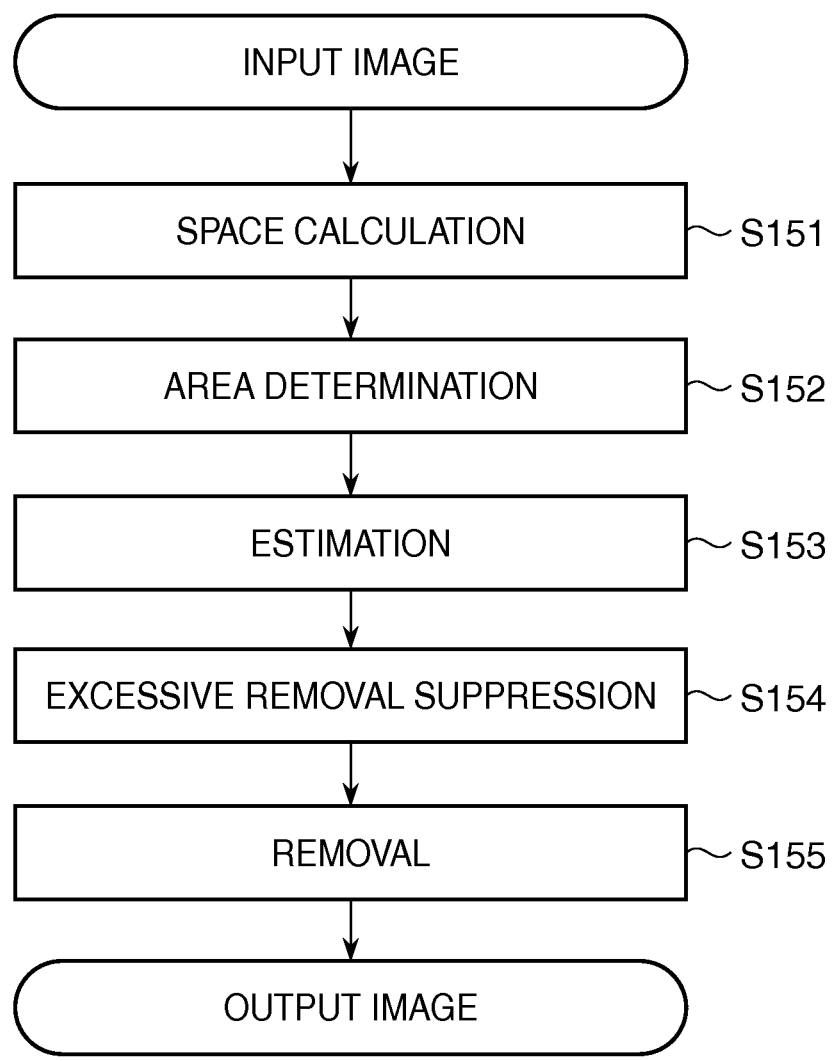
FIG. 4 is a flowchart showing color fringing removal process by image processing in the image pickup apparatus shown in FIG. 1.

FIG. 4 is a flowchart showing color fringing removal process performed by image processing in the image pickup apparatus.

In FIG. 4, the present process is performed by the color fringing removal unit 140 in the image pickup apparatus based on a program. The color fringing removal process by the color fringing removal unit 140 includes a space calculation step S151, a region determination step S152, an estimation step S153, an excessive removal suppression step S154 and a removal step S155. In the color fringing removal process, the B plane from among the color planes (R, G and B planes) is determined as a color fringing removal target, and the G plane is used as a reference plane.

First, in the space calculation step S151, the color fringing removal unit 140 calculates brightness gradients Blea and Glea for the B plane and the G plane, respectively, according to the below-indicated formulae. Here, the position of each pixel in the image pickup device 110 is represented by two-dimensional coordinates, and the brightness of a pixel, which is represented by coordinates (x, y), in the B plane and the G plane is expressed by B(x, y) and G(x, y)

$$Blea = \left(\frac{dB}{dx}, \frac{dB}{dy}\right)$$
$$= \left(\frac{B(x+1, y) - B(x-1, y)}{2}, \frac{B(x, y+1) - B(x, y-1)}{2}\right)$$

$$Glea = \left(\frac{dG}{dx}, \frac{dG}{dy}\right)$$
$$= \left(\frac{G(x+1, y) - G(x-1, y)}{2}, \frac{G(x, y+1) - G(x, y-1)}{2}\right)$$

Here, G(x+1, y) and B(x+1, y) are brightness values (pixel values) of the pixel located just to the right of the attention pixel (x, y) in the G plane and the B plane. G(x−1, y) and B(x−1, y) are brightness values of the pixel located just to the left of the attention pixel (x, y) in the G plane and the B plane. G(x, y+1) and B(x, y+1) are brightness values of the pixel just beneath the attention pixel (x, y) in the G plane and the B plane. G(x, y−1) and B(x, y−1) are brightness values of the pixel just above the attention pixel (x, y) in the G plane and the B plane.

Next, in the region determination step S152, the color fringing removal unit 140 performs monotonic increase/decrease determination for each pixel in the B plane. The details of the monotonic increase/decrease determination will be described using the flowchart in FIG. 5, and FIGS. 6 and 7.

Figure 5:
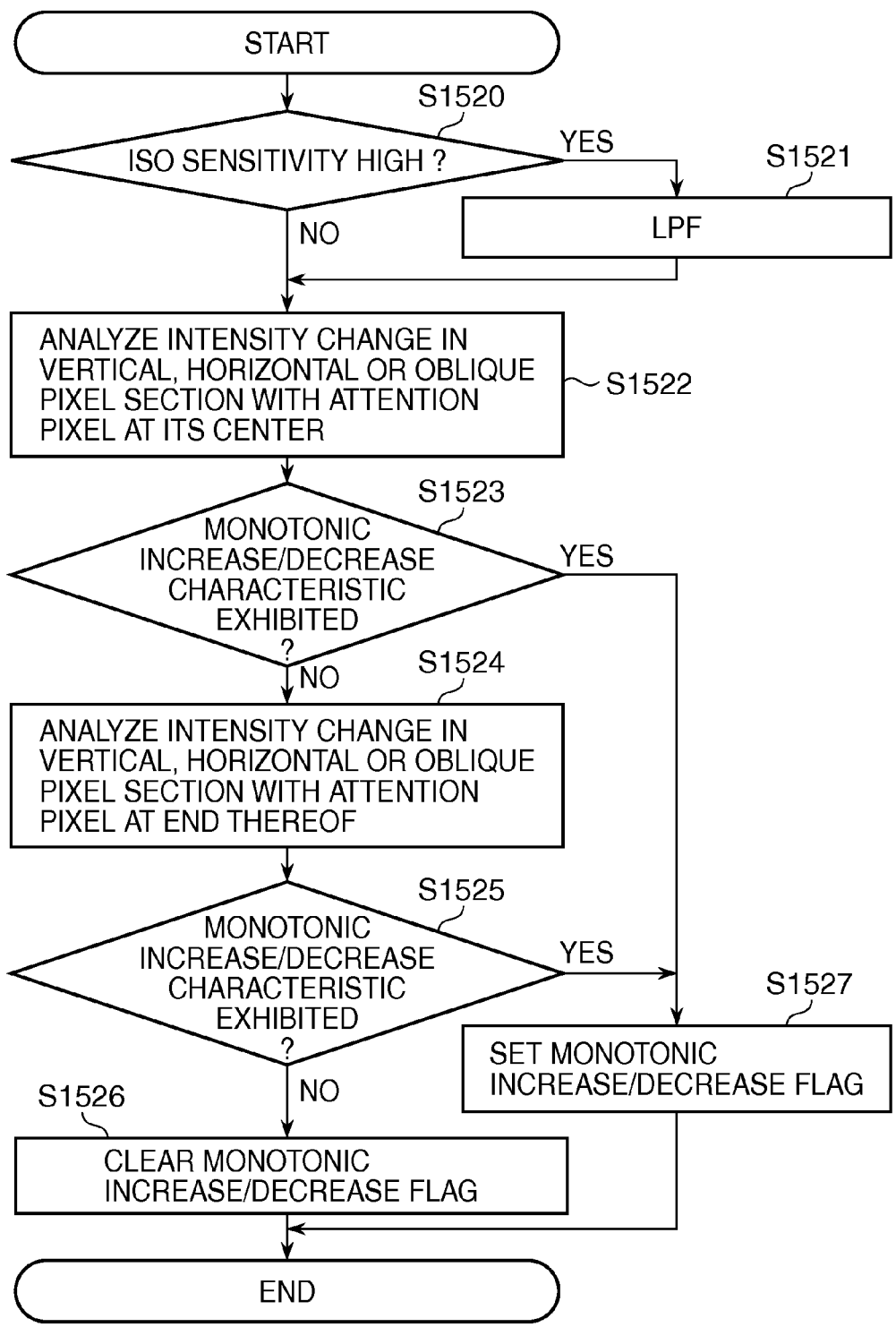
FIG. 5 is a flowchart showing monotonic increase/decrease determination process by image processing in the image pickup apparatus shown in FIG. 1.

In FIG. 5, first, the color fringing removal unit 140 determines whether or not the ISO sensitivity is high (step S1520). If the ISO sensitivity is high, the process proceeds to the subsequent step S1521, and if the ISO sensitivity is not high, the process proceeds to step S1522. The color fringing removal unit 140 analyzes intensity (brightness) change in input signals input from the demosaicking unit 130 for vertical, horizontal and oblique pixel sections each having the attention pixel as its center (step S1522). Furthermore, the color fringing removal unit 140 determines whether or not the intensity change in the input signals in the pixel sections exhibits a monotonic increase/decrease characteristic (step S1523).

As a result of the determination, if the intensity change in the input signals in the pixel sections does not exhibit a monotonic increase/decrease characteristic, the color fringing removal unit 140 analyzes intensity change in input signals for the vertical, horizontal and oblique pixel sections each having the attention pixel at an end thereof (step S1524). Furthermore, the color fringing removal unit 140 determines whether or not the intensity change in the input signals in the pixel sections exhibits a monotonic increase/decrease characteristic (step S1525).

Figure 6:
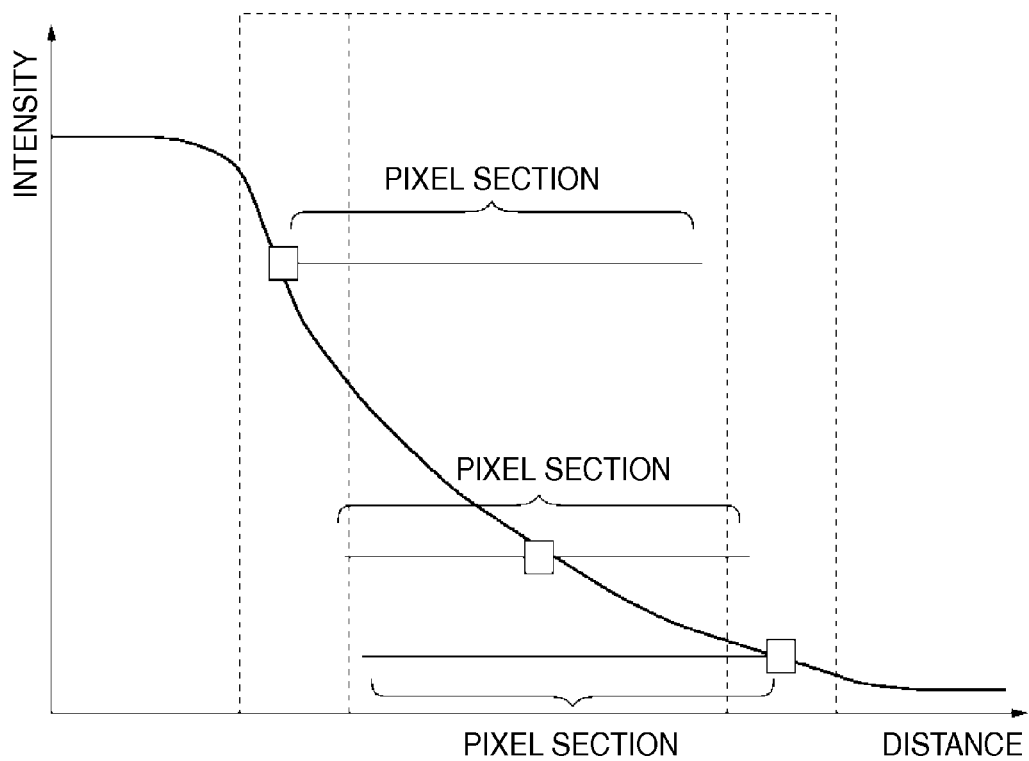
FIG. 6 is a graph showing an example of monotonic increase/decrease determination target pixel sections exhibiting a monotonic increase/decrease characteristic.
Figure 7:
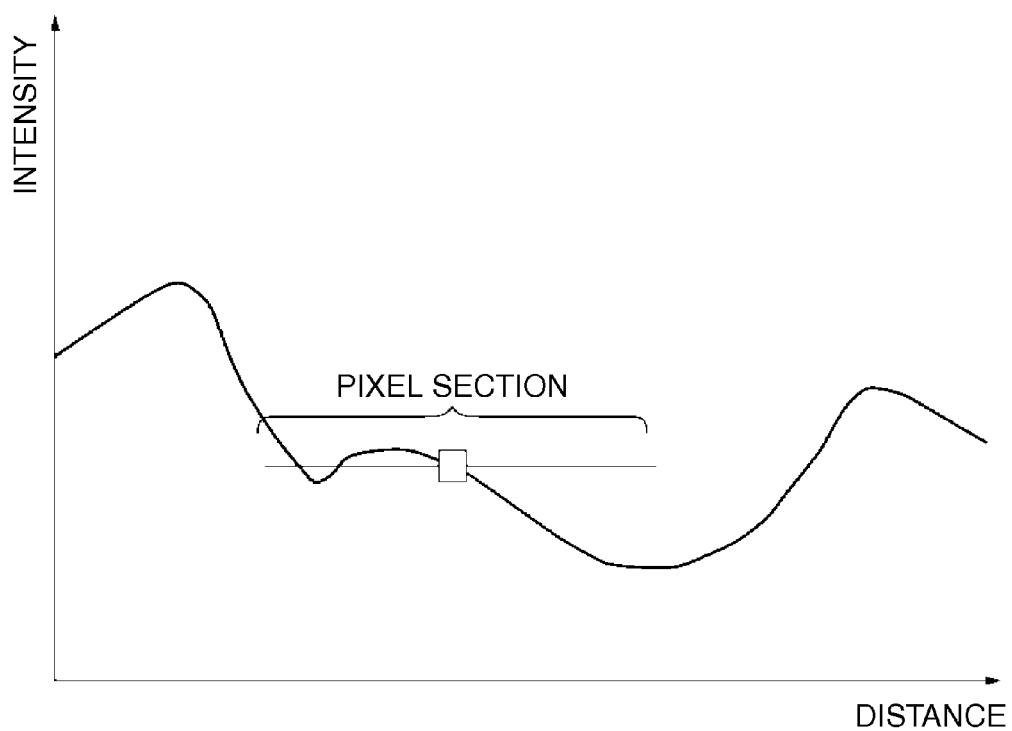
FIG. 7 is a graph showing an example of a monotonic increase/decrease determination target pixel section exhibiting no monotonic increase/decrease characteristic.

FIG. 6 shows an example of a monotonic increase/decrease determination target pixel section having a monotonic increase/decrease characteristic, and FIG. 7 shows an example of a monotonic increase/decrease determination target pixel section not having a monotonic increase/decrease characteristic. A pixel section having a monotonic increase/decrease characteristic means that the input signal intensity consecutively increases or consecutively decreases from one end to the other end of the pixel section. Monotonic increase/decrease determination is made for input signals exhibiting intensity change illustrated in FIGS. 6 and 7. The white squares shown in FIGS. 6 and 7 represent an attention pixel.

For an image whose input signal intensity change exhibits a monotonic increase/decrease characteristic as shown in FIG. 6, the color fringing removal unit 140, as a result of the analysis at step S1522, determines that the image has a monotonic increase/decrease characteristic (step S1523) because a pixel section, which is subjected to the monotonic increase/decrease determination, also has a monotonic increase/decrease characteristic. Meanwhile, for an image whose input signal change exhibits the characteristic of increasing and decreasing as illustrated in FIG. 7, the color fringing removal unit 140 determines that the image has no monotonic increase/decrease characteristic (step S1523).

Through the above-described determination, if it has been determined that the intensity change in the input signals in the pixel section has a monotonic increase/decrease characteristic (monotonic increase characteristic or monotonic decrease characteristic), the color fringing removal unit 140 sets a monotonic increase/decrease flag (step S1527). Meanwhile, if it has been determined that the intensity change in the input signals in the pixel section does not have a monotonic increase/decrease characteristic (monotonic increase characteristic or monotonic decrease characteristic), the color fringing removal unit 140 clears a monotonic increase/decrease flag (step S1526).

The above-described monotonic increase/decrease determination is applied for each pixel in the B plane. As a result, the color fringing removal unit 140 assigns "1" to each pixel if a monotonic increase/decrease flag is set for the pixel, and assigns "0" to the pixel if a monotonic increase/decrease flag is not set, and produces and holds a monotonic increase/decrease determination result plane for the results, and uses it at the removal step S155. The details of a method for using the monotonic increase/decrease determination result plane will be described later.

Figure 8A:
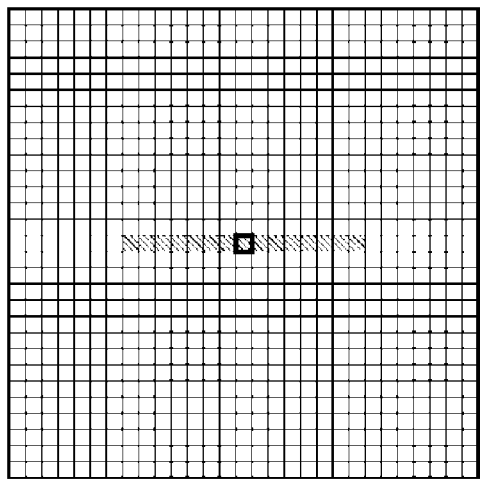
FIGS. 8A to 8D each show a pixel section for monotonic increase/decrease determination, the pixel section having an attention pixel in its center, in the monotonic increase/decrease determination process shown in FIG. 5.
Figure 8B:
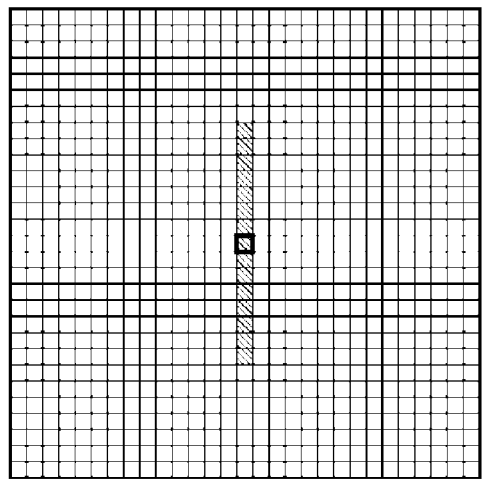

Next, a method for setting a pixel section in which the monotonic increase/decrease determination is made for the attention pixel will be described using FIGS. 8A to 8D and 9A to 9H. FIGS. 8A to 8D each show a pixel section for the monotonic increase/decrease determination, the pixel section having an attention pixel in its center. FIGS. 9A to 9H each show a pixel section for the monotonic increase/decrease determination, the pixel section having an attention pixel in an end thereof. For a method for setting a pixel section having an attention pixel at its center, setting a horizontal/vertical pixel section with the attention pixel at its center, which is shown in FIGS. 8A and 8B, can be considered.

Figure 8C:
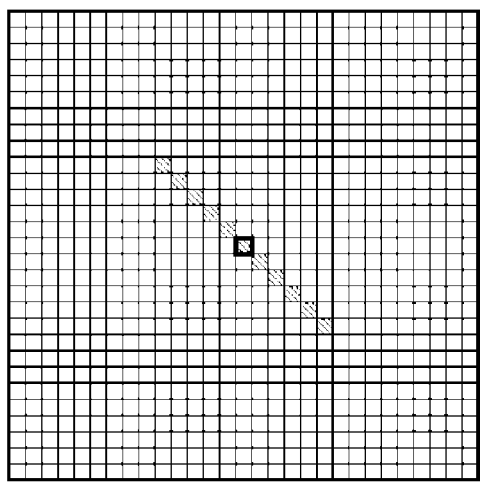
Figure 8D:
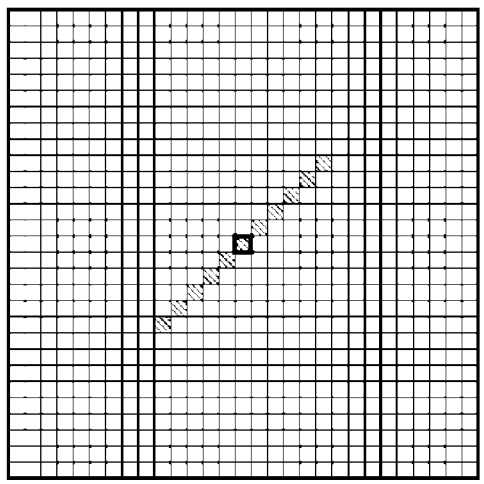
Figure 9A:
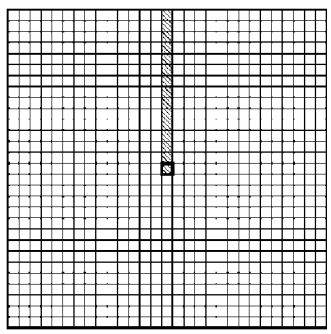
FIGS. 9A to 9H each show a pixel section for monotonic increase/decrease determination, the pixel section having an attention pixel in an end thereof, in the monotonic increase/decrease determination process shown in FIG. 5.
Figure 9B:
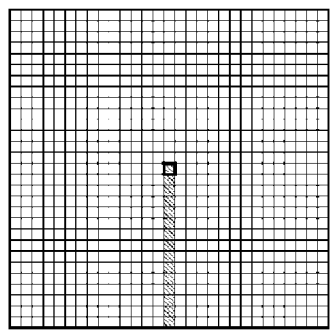
Figure 9C:
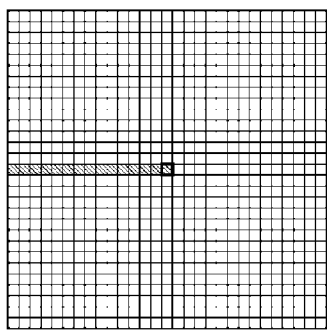
Figure 9D:
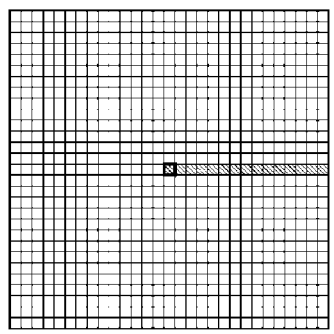
Figure 9E:
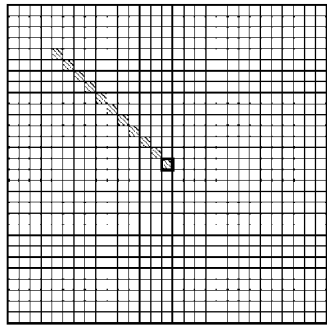
Figure 9F:
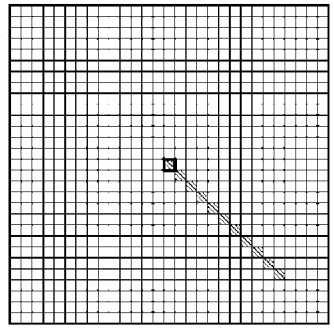
Figure 9G:
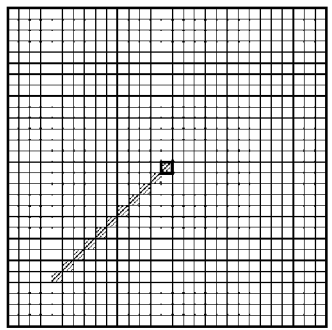
Figure 9H:
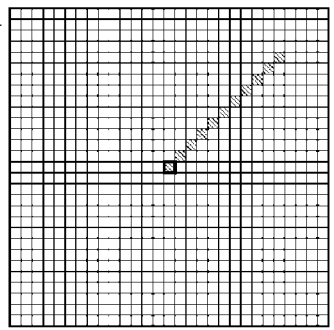

Also, for a method for setting a pixel section having an attention pixel at its center, setting an oblique pixel section with the attention pixel at its center, which is shown in FIGS. 8C and 8D, can be considered. In other words, an oblique pixel section can be provided with isotropy if the pixel section is set to have a distance equivalent to that of the horizontal/vertical pixel section. In this case, the angle of the oblique pixel section is not limited to 45°, which is shown in the figures, and any angle may be set. The distance d of the pixel section in that case can be calculated according to the following formula.

$$d = x/\cos\theta$$

wherein x indicates a distance in the horizontal direction, and θ indicates the angle from a horizontal plane.

Meanwhile, for color fringing around a highlighted portion of an image or color fringing around a shadowed portion of an image, as a result of being affected by saturation or noise, the determination target pixel section has no monotonic increase/decrease characteristic despite of the existence of the color fringing and thus, correct determination cannot be made. In that case, the method of setting a pixel section having the attention pixel at an end thereof, which is as shown in FIGS. 9A to 9H, is effective.

The monotonic increase/decrease determination is made according to the method as described above, and if it has been determined that at least any one of pixel sections shown in FIGS. 8A to 8D and 9A to 9H has a monotonic increase/decrease characteristic, the color fringing removal unit 140 determines the attention pixel is a pixel having a monotonic increase/decrease characteristic.

The present embodiment uses the input signal intensity as a target for the monotonic increase/decrease determination, brightness gradient may be used. In that case, color fringing is determined as existing if change in the brightness gradient of a certain pixel section exhibits the characteristic of inverting only once. It is effective to adjust a proper value for the number of pixels in a pixel section to the fringe width of the smallest color fringing from among color fringing occurring under certain imaging conditions of the image pickup apparatus.

The fringe width of the color fringing differs depending on the imaging conditions of the image pickup apparatus (such as the aperture value, the focal length, the focusing accuracy, the focal position in the image plane, and the coordinates in the image pickup device). Thus, as a result of adjusting a proper value for the number of pixels in a pixel section to color fringing with the smallest width from among various color fringing occurring under various types of imaging conditions, color fringing with the smallest width can be detected. For detection of color fringing with the largest width, a pixel section adjusted to color fringing with the smallest width may also be used.

As a result of making the monotonic increase/decrease determination as described above, color fringing, which is intended to detect, can be extracted. However, depending on the imaging conditions such as a high ISO sensitivity, noise is superimposed on the input signals, lowering the S/N ratio, and as a result, it can be considered that the color fringing does not have a monotonic increase/decrease characteristic. In that case, it is effective to perform filtering for the input signals via a digital filter (step S1521). The present embodiment shows the case where a low-pass filter (LPF) is used for a digital filter as an example.

Although several methods for subjecting the input signals to low-pass filtering can be considered, an example in which the filtering is performed via a low-pass filter with weighting factors of [1, 2, 1] in which the weighting factor of the attention pixel is twice those of adjacent pixels. In a region of 3×3 pixels in an image shown in FIG. 10, where p is the attention pixel, when filtering is performed in a horizontal direction via the low-pass filter weighting factors of [1, 2, 1], the signal p' of attention pixel can be expressed by the following formula.

$$p' = (d \cdot 1 + p \cdot 2 + e \cdot 1)/4$$

Where d, p, and e are signals of the respective pixels d, p, and e.

Figure 11:
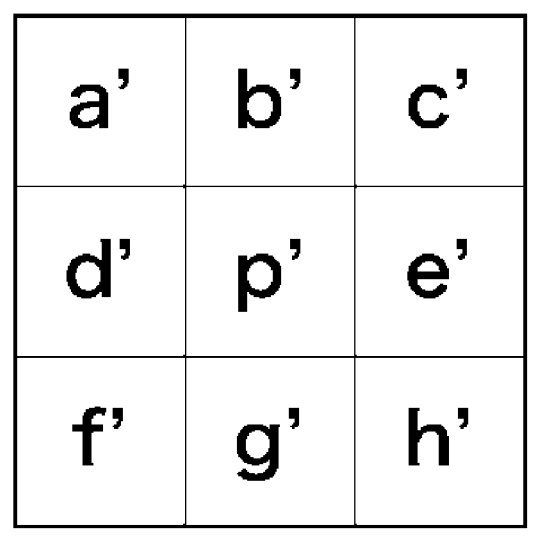

When a similar calculation is made for the adjacent pixels, the state shown in FIG. 11 can be obtained. Next, when filtering is performed in a vertical direction via the low-pass filter with weighting factors of [1, 2, 1], the signal p" of attention pixel can be expressed by the following formula.

$$p'' = (b' \cdot 1 + p' \cdot 2 + g' \cdot 1)/4$$

Figure 12:
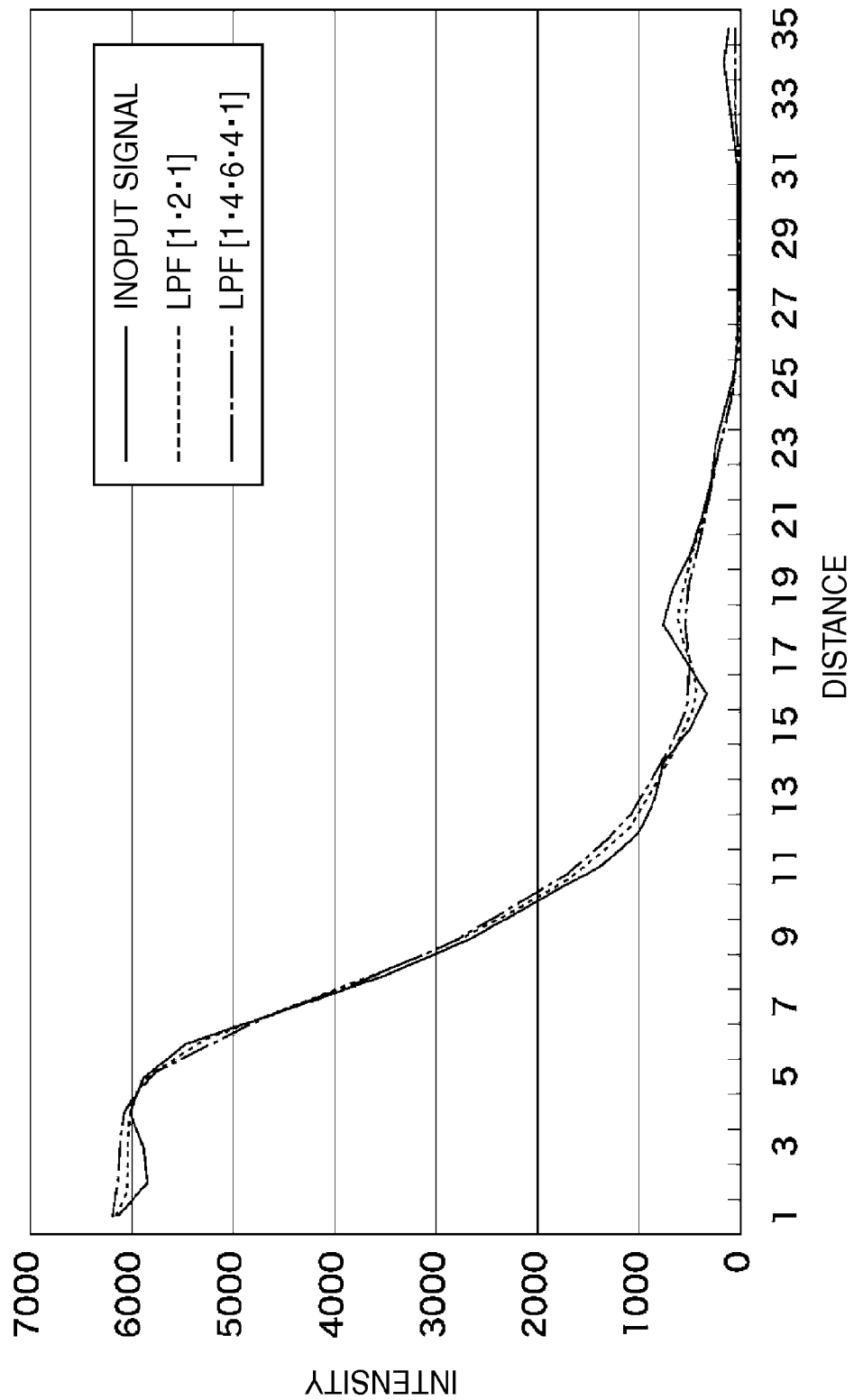
FIG. 12 is a graph showing an example of input signal change when applying low-pass filtering process to each pixel.

FIG. 12 shows an example of change in input signals when being subjected to filtering via a low-pass filter. In FIG. 12, the abscissa axis represents a cross-section of an image (a pixel section starting from an attention pixel), and the ordinate axis represents the signal intensity in the plane. In the figure, the solid line indicates input signals, the dotted line indicates the case where the input signals are subjected to filtering via the low-pass filter with weighting factors of [1, 2, 1], and the dashed and dotted line indicates the case where the input signals are subjected to filtering via a low-pass filter with weighting factors of [1, 4, 6, 4, 1]. Here, [1, 4, 6, 4, 1] means that low-pass filtering process is applied by providing a weighting factor for each of the pixels adjacent to the attention pixel and pixels outside and next to the adjacent pixels.

As a result of smoothing the input signals by the low-pass filtering process, it becomes possible to highlight the monotonic increase/decrease characteristic that color fringing originally has. In the present embodiment, low-pass filtering process is applied in the order from the horizontal direction to the vertical direction, the low-pass filtering process is not limited to this. The low-pass filtering process may be applied in the reversed order from the vertical direction to the horizontal direction. Also, horizontal and vertical low-pass filtering process can be applied simultaneously by calculating two-dimensional low-pass filter factors.

Figure 13:
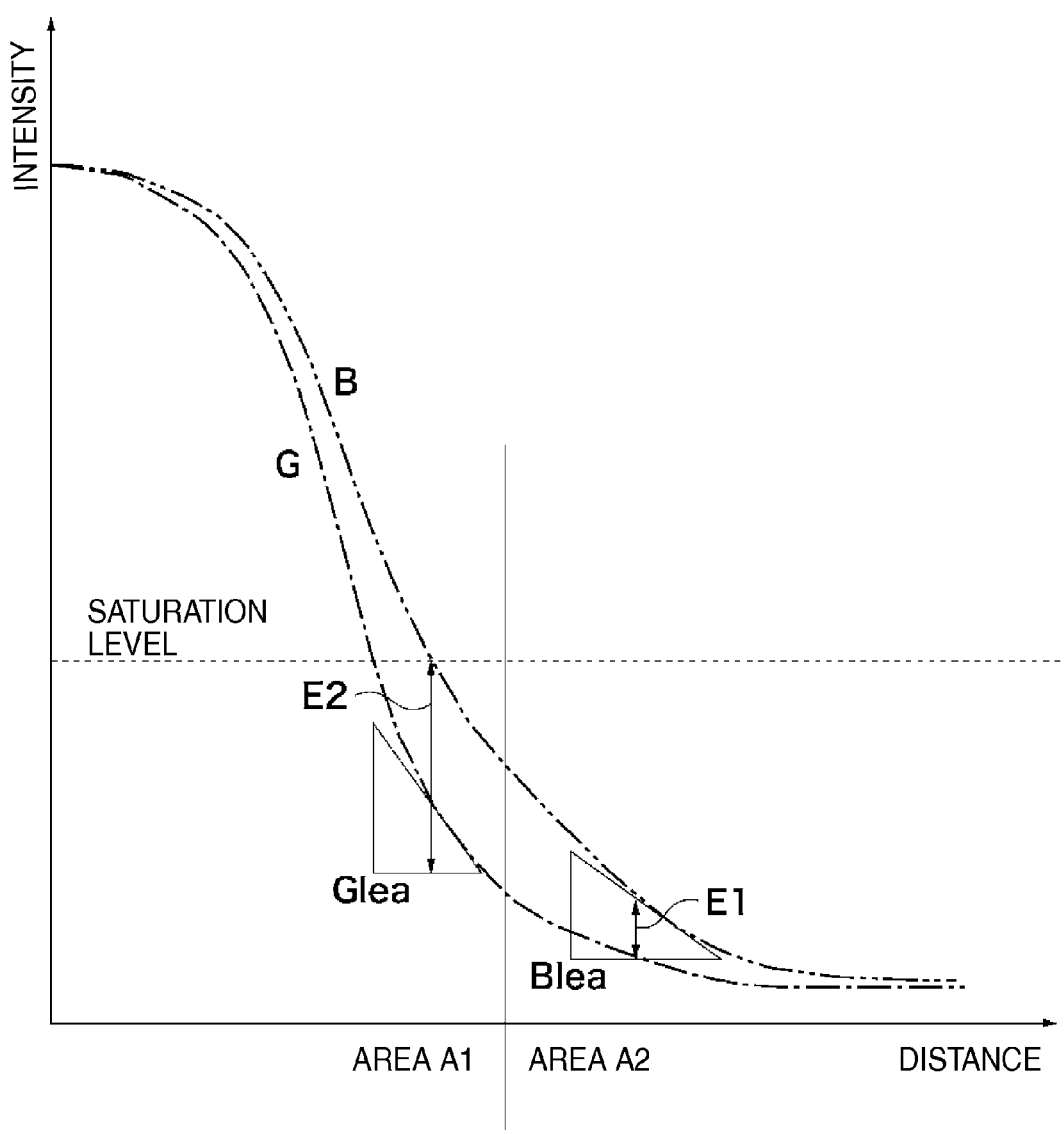
FIG. 13 is a graph showing typical intensity change in blue fringing.

Referring back to FIG. 4, in the estimation step S153, the color fringing removal unit 140 estimates the extra intensity of the B plane, which causes color fringing, for each of the pixels in the color image. FIG. 13 shows typical intensity change in blue color fringing. In FIG. 13, the abscissa axis represents a cross-section of the image, and the ordinate axis represents the intensities of the B plane and the G plane. In FIG. 13, it is assumed that a light source exists at the left end as a high brightness subject exceeding the saturation brightness. For the area around the light source, which is originally not bright, the bottom of the intensity change profile extends exponentially owing to light running from the light source due to aberration or flare.

Fringing occurs even in the G plane, which is the reference plane, and it extends to a certain degree and but, is small compared to the B plane, which is the color fringing removal target. Also, the image pickup device cannot measure an intensity equal to or exceeding a certain saturation level. In such intensity change, when the intensity of the B plane, which is the color fringing removal target, exceeds the intensity of the G plane, which is the reference plane, blue color fringing occurs.

In the present embodiment, the amount of fringing in the B plane, which is the color fringing removal target, is estimated from the gradient of the intensity change for the B plane. Therefore, the absolute value of the brightness gradient Blea of the B plane is multiplied by a factor $k_1$ to obtain a first estimate fringing amount E1.

$$E1 = k_1|Blea|$$

Here, $k_1$ is a positive value. However, in a region A1 in which the B plane is saturated, the brightness gradient is 0, and thus, the brightness gradient before the saturation cannot be obtained.

Therefore, an estimate fringing amount E2 for the region A1 in which the B plane is saturated is estimated from the brightness gradient Glea in the intensity change in the G plane.

$$E2 = k_2|Glea|$$

Here, $k_2$ is a positive value.

Figure 14:
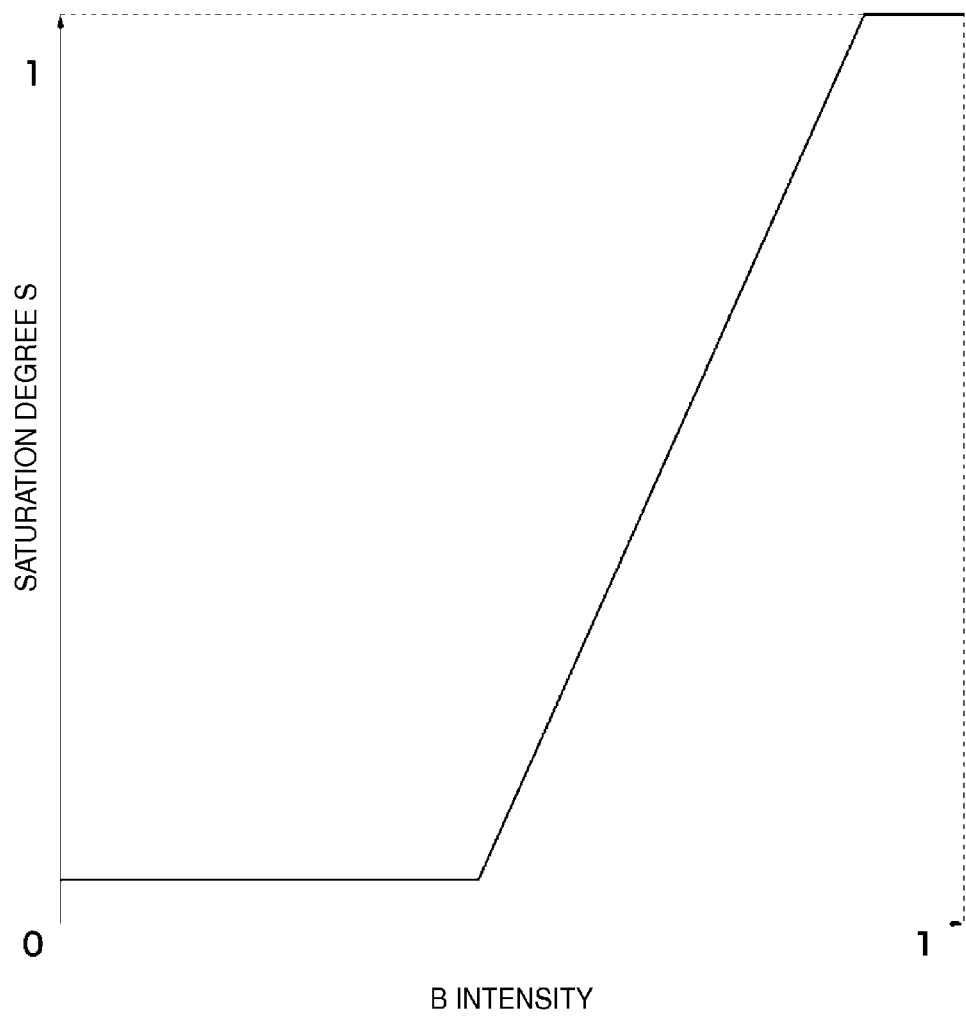
FIG. 14 is a graph showing a characteristic of non-linear conversion for the intensity of a B plane.

Next, a nonlinear conversion is performed for the intensity of the B plane to provide a saturation degree S. This nonlinear conversion indicates whether or not the B plane is saturated, and for a region in which the intensity of the B plane is saturated, the saturation degree S is 1, and for a region in which the intensity of the B plane is small, the saturation degrees is 0. Although the saturation degree S may be a binary value of 0 or 1, the saturation degree S may be a value consecutively varying from 0 to 1 as shown in FIG. 14.

Then, the color fringing removal unit 140 selects the estimate fringing amount E1 or the estimate fringing amount E2 calculated at the estimation step S153, based on the provided saturation degree S. In other words, if the saturation degree S is a binary value of 0 or 1, a new estimate fringing amount E is set as:

$$E=E1 \text{(where S=0); and}$$

$$E=E2 \text{(where S=1)}.$$

Also, if the saturation degree S is a value consecutively varying from 0 to 1, a new estimate fringing amount E is set as:

$$E=(1-S)E1+SE2.$$

Next, at the excessive removal suppression step S154, the color fringing removal unit 140 corrects the estimate fringing amount E and determines an actual removal amount E'. The estimate fringing amount (removal amount) estimated at the estimation step S153 is calculated according to a certain model, and does not necessarily agree with the actual fringing amount.

For example, even for light detected by the same B plane, light with a wavelength of 450 nm and light with a wavelength of 400 nm exhibit different manners of fringing; however, this is not taken into consideration in the estimation step S153. If the estimate fringing amount (removal amount) is much smaller than actual fringing amount, a slight tincture of blue remains even after the removal of the blue color fringing.

Meanwhile, if the estimate fringing amount (removal amount) is much larger than actual fringing amount, the B plane may be overly reduced relative to the gray background, resulting in yellow-green.

In particular, the latter case (the case resulting in yellow-green) provides unnaturalness and gives large discomfort to viewers. Therefore, at the excessive removal suppression step S154, a limitation is imposed to effect fringing removal only within a certain hue range. Thus, first, the color fringing removal unit 140 calculates the chromaticity of each pixel, which can be determined as follows, relative to the intensities of the respective R, G and B planes.

$$\begin{pmatrix} x \\ y \\ z \end{pmatrix} = \begin{pmatrix} 0.41 & 0.36 & 0.18 \\ 0.21 & 0.75 & 0.07 \\ 0.02 & 0.12 & 0.95 \end{pmatrix} \begin{pmatrix} R \\ G \\ B \end{pmatrix}$$

$$a = 5(x-y)$$

$$b = 2(y-z)$$

Figure 15:
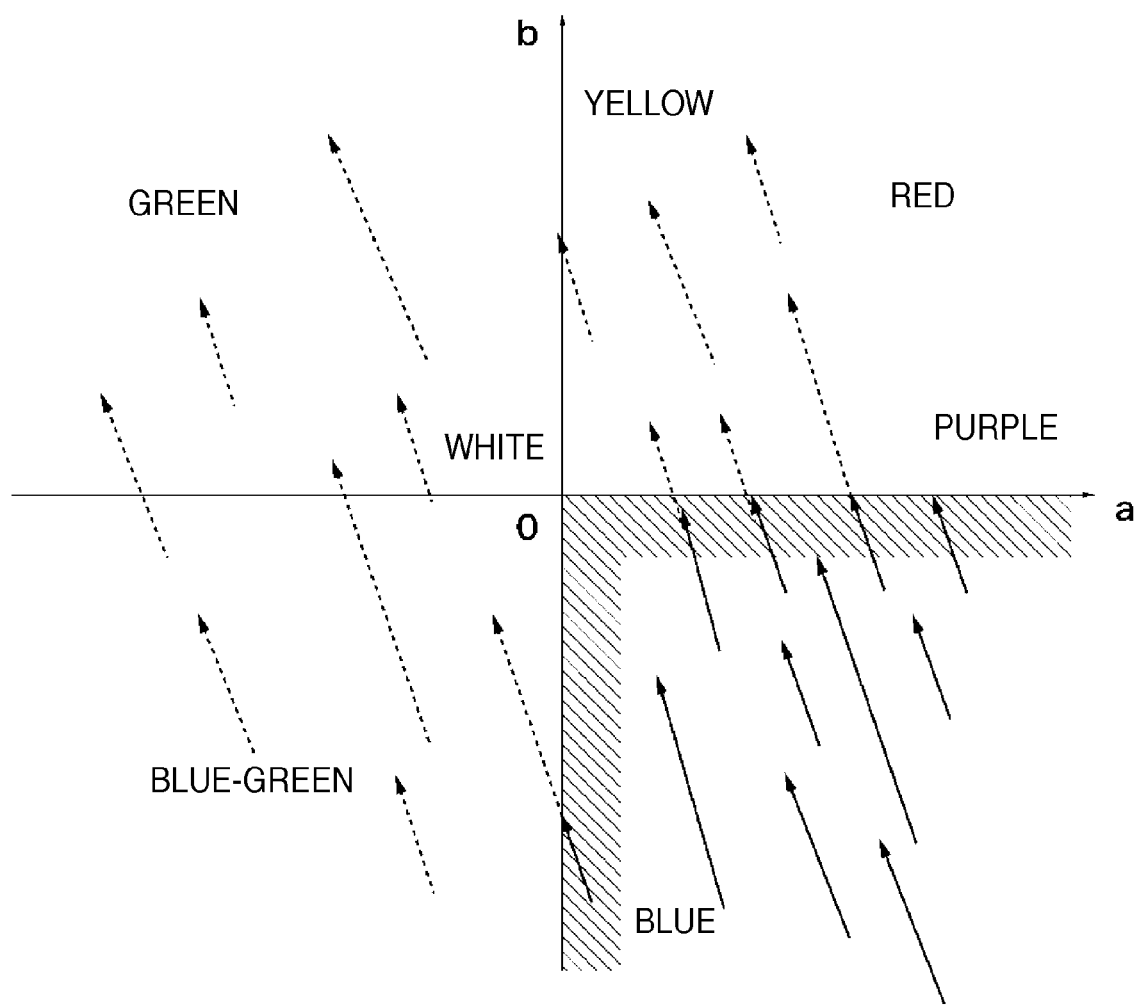
FIG. 15 shows chromaticity coordinate a-b plane.

FIG. 15 shows a chromaticity coordinate a-b plane in which a is the abscissa axis and b is the ordinate axis. As shown in the figure, blue resides in the fourth quadrant of the chromaticity coordinate a-b plane, which is hatched (red, yellow and purple reside in the first quadrant, green and white reside in the second quadrant, and blue-green resides in the third quadrant). The estimate fringing amount E is deducted from the intensity of the B plane, resulting in B=B−E, and thus, the chromaticity moves in the upper left direction on the chromaticity coordinate a-b plane, as indicated by dotted arrows. The starting point of each arrow is the chromaticity before the removal of the estimate fringing amount E, and the end point is a chromaticity after the removal of the estimate fringing amount E. Accordingly, if the effective hue range is limited to a>0 and b<0, the following conditions are provided:

$$B > 0.22R+0.68G; \text{ and } B > -1.84R+3.30G.$$

Thus, in the excessive removal suppression step S154, first, an actual removal amount E'=0 is set for pixels not satisfying the above conditional expressions, and such pixels are excluded from the color fringing removal target. Consequently, the pixels not satisfying the above conditional expressions do not vary at the color fringing removal step S155, and thus, the pixel values thereof will not be affected. In FIG. 15, only the fourth quadrant area, which is hatched, is the removal target.

Furthermore, also for pixels satisfying the above conditional expressions, a removal amount E' is set as follows:

$$E'=\min(E, B-(0.22R+0.68G), B-(-1.84R+3.30G)).$$

The hue change as a result of removal of the removal amount E', as shown in solid arrows in FIG. 15, remains within the fourth quadrant.

Although in the present embodiment, the hue change is limited by the fourth quadrant in the chromaticity coordinate a-b plane, it may be limited by any angle. In that case, the conditions are:

$$B > r1 \cdot G + r2 \cdot R; \text{ and } B > r3 \cdot G + r4 \cdot R.$$

Here, r1 to r4 can be calculated according to the below formulae using a limitation angle θ. The hue limitation is defined by two straight lines passing through the origin of the chromaticity coordinate a-b plane, and $\theta_1$ and $\theta_2$ are angles representing the two straight lines.

$$r1 = \frac{-0.358 \cdot \tan\theta_1 - 0.596}{-0.108 \cdot \tan\theta_1 - 0.878}$$

$$r2 = \frac{0.2 \cdot \tan\theta_1 - 0.193}{-0.108 \cdot \tan\theta_1 - 0.878}$$

$$r3 = \frac{-0.358 \cdot \tan\theta_2 - 0.596}{-0.108 \cdot \tan\theta_2 - 0.878}$$

$$r4 = \frac{0.2 \cdot \tan\theta_2 - 0.193}{-0.108 \cdot \tan\theta_2 - 0.878}$$

Consequently, decreasing the B plane beyond the hue limitation range as a result of the removal step S155 can be prevented. The color fringing removal unit 140 holds the removal amount E' for the color fringing removal target color plane, which has been calculated as described above, as a removal amount plane, and delivers it to the removal step S155. The above-described low-pass filtering process is applied to the removal amount plane. Although in the present embodiment, a simplified a-b plane has been used for the hue limitation, hue limitation process may be performed on the u-v plane using a matrix of 3×3 converted from RGB into YUV.

In the removal step S155, the color fringing removal unit 140 produces a new B plane by deducting the removal amount E' from the intensity of the B plane. The color fringing removal target is only the pixels each having a monotonic increase/decrease determination flag of "1" provided at the region determination step S152.

Accordingly, if the monotonic increase/decrease determination flag is "1", the intensity B' of the new B plane is $B'=B-E'$; and if the monotonic increase/decrease determination flag is "0", the intensity B' of the new B plane is $B'=B$.

The color image with the B plane corrected as described above is delivered to the view correction unit 150 as an output of the color fringing removal unit 140.

Figure 10:
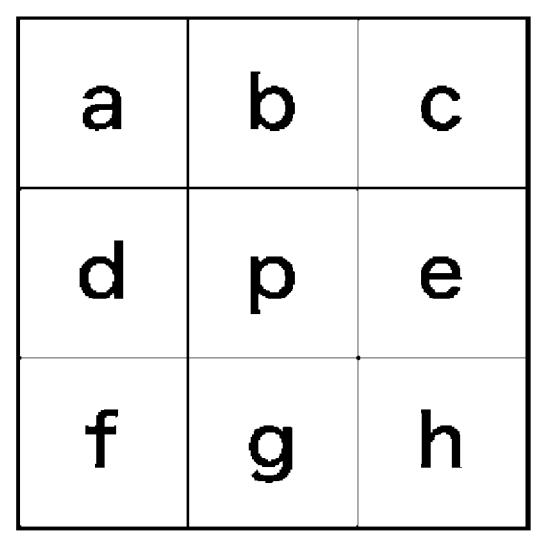
Figure 16:
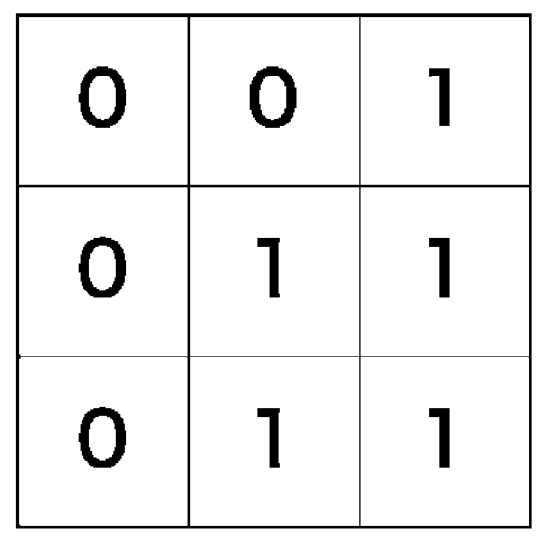

The case where the monotonic increase/decrease determination flag value, which is the monotonic increase/decrease determination result for a certain a region of 3×3 pixels in the image shown in FIG. 10, is changed between adjacent pixels as shown in FIG. 16 will be considered. In such a case, the removal amount varies at the boundary between pixels (the case of performing removal between adjacent pixels and the case of not performing the removal are mixed), and the intensity sharply changes, which may provide an unnatural image and give a feeling of discomfort to viewers. Therefore, in such a case, the method of low-pass filtering the produced removal amount plane is effective.

Also, smoothing for the boundary portion (monotonic increase/decrease determination result plane) may be performed by calculating a gain for each pixel in a color plane according to the below formulae using the monotonic increase/decrease determination result plane, and multiplying the removal amount by the gain.

Gain=($a$Flag+$b$Flag+$c$Flag+$d$Flag+$p$Flag+$e$Flag+$f$Flag+$g$Flag+$h$Flag)/9

$E''=\text{Gain} \times E'$

In the example shown in FIG. 16, the removal amount E" for a pixel p can be calculated as follows.

0.56=(0+0+1+0+1+1+0+1+1)/9

$E'=0.56 \times E'$

By the method described above, only color fringing can be removed without giving a feeling of discomfort.

As described above, according to the present embodiment, the color fringing removal unit 140 in the image pickup apparatus determines a region in which the signal levels in any color plane from among a plurality of color planes included in a color image exhibit a monotonic increase or a monotonic decrease, as a color fringing region in which color fringing occurs. Furthermore, the color fringing removal unit 140 estimates the intensity of the color fringing in the color fringing region according to the difference in signal intensity between the plurality of color planes included the color image, and deducts the estimate value of the estimated intensity of the color fringing from the intensity of the color fringing in the color fringing region. Consequently, the color fringing in the color image can further effectively be suppressed by image processing.

[Other Embodiments] Although the present embodiment has been described taking a configuration in which an image pickup apparatus includes the image pickup device 110, the A/D conversion unit 120, the demosaicking unit 130, the color fringing removal unit 140, the view correction unit 150, the compression unit 160, and the recording unit 170, as an example, the image pickup apparatus according to the present invention is not limited to this. An image pickup apparatus may have a configuration including a part or all of the image pickup device 110 to the recording unit 170 excluding the color fringing removal unit 140, and an image processing apparatus having the function of the color fringing removal unit 140 may be provided separately from the image pickup apparatus. In this case, a color image taken by the image pickup apparatus and stored in a recording medium (e.g., semiconductor memory or magnetic/optical disk) may be input to the image processing apparatus to perform image processing.

It is to be understood that the object of the present invention may also be accomplished by supplying a system or an apparatus with a storage medium in which a program code of software which realizes the functions of the above described embodiment is stored, and causing a computer (or CPU or MPU) of the system or apparatus to read out and execute the program code stored in the storage medium.

In this case, the program code itself read from the storage medium realizes the functions of any of the embodiments described above, and hence the program code and the storage medium in which the program code is stored constitute the present invention.

Examples of the storage medium for supplying the program code include a floppy (registered trademark) disk, a hard disk, a magnetic-optical disk, a CD-ROM, a CD-R, a CD-RW, a DVD-ROM, a DVD-RAM, a DVD-RW, a DVD+RW, a magnetic tape, a nonvolatile memory card, and a ROM. Alternatively, the program code may be downloaded via a network.

Further, it is to be understood that the functions of the above described embodiment may be accomplished not only by executing a program code read out by a computer, but also by causing an OS (operating system) or the like which operates on the computer to perform a part or all of the actual operations based on instructions of the program code.

Further, it is to be understood that the functions of the above described embodiment may be accomplished by writing a program code read out from the storage medium into a memory provided on an expansion board inserted into a computer or in an expansion unit connected to the computer and then causing a CPU or the like provided in the expansion board or the expansion unit to perform a part or all of the actual operations based on instructions of the program code.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus for an image pickup device including a plurality of color filters, the image processing apparatus comprising:
a determination unit adapted to determine a region in which a signal level for a color plane of image data produced by the image pickup device, corresponding to at least one of the plurality of color filters, or a signal level for a brightness plane produced from the image data exhibits a monotonic increase or a monotonic decrease in a predetermined section of the region, as a color fringing region in which color fringing occurs;
an estimation unit adapted to estimate an intensity of the color fringing according to a difference in signal intensity between a plurality of color planes of the image data corresponding to the plurality of color filters in the color fringing region; and
a removal unit adapted to reduce the color fringing in the color fringing region based on the estimated intensity of the color fringing in the color fringing region.

2. The image processing apparatus according to claim 1, wherein said determination unit determines whether or not, after a low-pass filter is applied for the signal level for the color plane corresponding to the at least one of the plurality of colors filters or the signal level for the brightness plane, the signal level for the color plane or the signal level for the brightness plane exhibits a monotonic increase or a monotonic decrease in the predetermined section.

3. The image processing apparatus according to claim 1, wherein said determination unit determines the region, when the signal level for the color plane corresponding to at least one of the plurality of colors filters, or the signal level for the brightness plane exhibits, a monotonic increase or a monotonic decrease in the predetermined section of the region with respect to one direction of a horizontal direction, a vertical direction, and an oblique direction with an attention pixel of the image data as a center, as the color fringing region in which color fringing occurs.

4. The image processing apparatus according to claim 1, further comprising a space calculation unit adapted to calculate a signal level gradient for each of the plurality of color planes in the color fringing region, wherein said estimation unit estimates the intensity of the color fringing based on the estimated signal level gradient.

5. A method of controlling an image processing apparatus for an image pickup device including a plurality of color filters, the method comprising:
a determination step of determining a region in which a signal level for a color plane of image data produced by the image pickup device, corresponding to at least one of the plurality of color filters, or a signal level for a brightness plane produced from the image data exhibits a monotonic increase or a monotonic decrease in a predetermined section of the region, as a color fringing region in which color fringing occurs;
an estimation step of estimating an intensity of the color fringing according to a difference in signal intensity between a plurality of color planes of the image data corresponding to the plurality of color filters in the color fringing region; and
a removal step of reducing the color fringing in the color fringing region based on the estimated intensity of the color fringing in the color fringing region.

* * * * *